US007957168B2

(12) United States Patent
Zacharias et al.

(10) Patent No.: US 7,957,168 B2
(45) Date of Patent: Jun. 7, 2011

(54) INVERTER

(75) Inventors: Peter Zacharias, Kassel (DE); Jens Friebe, Nörten-Hardenberg (DE); Felix Blumenstein, Hessisch Lichtenau (DE); Ann-Katrin Gerlach, Kassel (DE); Jan Scheuermann, Niedenstein (DE); Matthias Zinn, Jesberg (DE)

(73) Assignee: SMA Solar Technology AG, Niestetal (DE)

( * ) Notice: Subject to any disclaimer, the term of this patent is extended or adjusted under 35 U.S.C. 154(b) by 292 days.

(21) Appl. No.: 12/221,124

(22) Filed: Jul. 31, 2008

(65) Prior Publication Data
US 2009/0046492 A1 Feb. 19, 2009

(30) Foreign Application Priority Data

Aug. 14, 2007 (DE) .......................... 10 2007 038 959

(51) Int. Cl.
*H02M 7/5387* (2007.01)
*H02M 7/493* (2007.01)
(52) U.S. Cl. .......................................... 363/132; 363/71
(58) Field of Classification Search .................. 363/95, 363/97, 98, 131, 132, 65, 71; 323/272
See application file for complete search history.

(56) References Cited

U.S. PATENT DOCUMENTS

| 6,009,002 A * | 12/1999 | Steimer | 363/34 |
| 6,320,767 B1 * | 11/2001 | Shimoura et al. | 363/37 |
| 7,646,182 B2 * | 1/2010 | Nakabayashi et al. | 323/272 |
| 2002/0153778 A1 | 10/2002 | Oughton, Jr. et al. | |
| 2007/0035975 A1 | 2/2007 | Dickerson et al. | |
| 2007/0047277 A1 | 3/2007 | Konishi et al. | |

FOREIGN PATENT DOCUMENTS

| DE | 19642522 | 4/1998 |
| DE | 19732218 | 3/1999 |
| DE | 10221592 | 12/2003 |
| DE | 10225020 | 12/2003 |
| DE | 102006012164 | 5/2005 |
| DE | 102004030912 | 1/2006 |
| DE | 102004037446 | 6/2006 |
| DE | 102005024465 | 11/2006 |
| EP | 1369985 A2 | 12/2003 |
| WO | WO 03/107522 | 12/2003 |

* cited by examiner

*Primary Examiner* — Gary L Laxton
(74) *Attorney, Agent, or Firm* — Eschweiler & Associates, LLC

(57) ABSTRACT

An inverter (1) for feeding electric power into a utility grid (7) or into a load is described. The inverter (1) contains two direct voltage inputs (2, 3), one first intermediate circuit (8) connected thereto and comprising two series connected capacitors (C1, C2) that are connected together at a ground terminal (14), two alternating voltage outputs (5, 6) of which one at least is provided with a grid choke (L1) and one bridge section (10). In accordance with the invention, a second intermediate circuit (9) that is devised at least for selectively boosting the direct voltage and is intended for supplying the bridge section (10) with positive and negative voltage is interposed between the first intermediate circuit (8) and the bridge section (10).

14 Claims, 4 Drawing Sheets

INVERTER

CROSS-REFERENCE TO RELATED APPLICATIONS

This application claims Priority from German Application No. DE 10 2007 038 959.2-32 filed on 14 Aug. 2007

FIELD OF THE INVENTION

The invention relates to an inverter of the type mentioned in the preamble of claim 1.

In order to feed electric power generated with direct voltage generators such as photovoltaic or fuel cell plants into an alternating current grid, in particular into the utility grid (50/60 Hz), inverters of various types are used. In most cases, a direct voltage converter (DC-DC controller) is provided between the direct voltage generator and the inverter and serves the purpose of converting the direct voltage delivered by the direct voltage generator into a direct voltage needed by the inverter or adapted thereto.

For different reasons, it is desired to ground one of the outputs of the direct voltage generator or to fix the potential of the direct voltage generator with respect to ground potential. The reason therefor is on the one side that such grounding is prescribed in some countries. On the other side, in the absence of grounding, diverse disadvantages occur during operation. One of them is the problem of high frequency leakage currents. Unavoidable, parasitic capacitances between the direct voltage generator and ground may give rise to considerable equalizing currents in case of potential fluctuations, said equalizing currents constituting an intolerable safety risk which make it necessary to provide for complex monitoring provisions with the help of error current sensors or the like for contact protection or for achieving electromagnetic compatibility (EMC) and which can only be securely avoided through grounding. Potential fluctuations at the direct voltage generator can further lead to permanent destruction of certain solar modules such as thin film modules or the like.

In principle, leakage currents of the type described can be readily avoided if direct voltage converters with transformers are being used to galvanically separate the direct voltage side from the alternating voltage side. However, independent on whether grid transformers or high frequency transformers are being used, transformers result in a reduction of efficiency, in parts considerable weight and size and/or an additional control expense, this being the reason why transformerless voltage converters are being preferred. The usual topologies of transformerless voltage converters however make the desired grounding either impossible since it would cause needed switches, capacitances or the like to short-circuit or result in an increased switching expense and in other drawbacks.

DESCRIPTION OF THE PRIOR ART

Therefore, numerous tests have already been conducted in order to avoid in another way the occurrence of the disadvantages mentioned. Circuits are known in particular, which serve the purpose of reducing the undesired leakage currents (e.g., DE 10 2004 037 466 A1, DE 102 21 592 A1, DE 10 2004 030 912 B3). In these circuits, a solar generator is e.g., operated in certain phases of the inner electric power transport, isolated from the grid. As the solar generator is periodically electrically connected to the grid, the charge of its parasitic capacitances is only slightly reversed so that the potential of the solar generator changes sinusoidally at grid frequency and at a voltage amplitude that corresponds to half the grid voltage. High frequency currents then only form through the slight voltage differences of the solar generator between two switching cycles and through asymmetries during switching. Capacitive leakage currents can thus be strongly minimized but cannot be completely avoided.

Further, a circuit arrangement is known (DE 102 25 020 A1), which uses a divided solar generator the center point of which is grounded. As a result, all the parts of the generator have a fixed potential and capacitive leakage currents cannot flow in principle. Since the two direct current sources have different outputs, a circuit for compensating the output differences and the voltages is moreover provided. In this proposed circuit, the disadvantages encountered are the high voltage differences in the solar generator and at the switches, the additional losses in the compensation circuit and the fact that at least four switches timed at high frequency are needed.

Besides, circuit arrays are already known by means of which a solar generator can be grounded on one side, despite the absence of a transformer. As a result, capacitive leakage currents are prevented as a matter of principle. One of these circuit arrays (DE 196 42 522 C1) however needs five active switches, one or two switches having to switch simultaneously at high frequency and to provide the mean output current. On this circuit, which is also referred to as a "flying inductor", the efficiency is negatively affected by the high number of components simultaneously participating in series in the current flow. The disadvantage of this circuit is that intermittent current pulses are impressed upon the grid, said pulses requiring a capacitive grid filter which, as a matter of principle, degrades not only the power factor but also the efficiency of the circuit in the part load range due to its own freewheeling power need. Although such a capacitive grid filter can be avoided with another known circuit (DE 197 32 218 C1), nine active switches are needed for this purpose of which two at least must be switched simultaneously at high frequencies so that the expense in terms of construction is even further increased and both the robustness and the efficiency of the overall device is negatively affected. The topology of a flying inductor further has the disadvantage that the voltage load of the switches depends on the grid voltage and is sensitive to grid failures.

Finally, devices are known (US 2007/0047277 A1) that are configured with two stages and that comprise, beside the actual inverter (DC-AC converter), a direct voltage or a DC-DC converter. The inverters are provided with a bipolar voltage intermediate circuit containing two series-connected capacitors that are connected together at a ground terminal associated with the neutral conductor of the respective grid and connected therewith. In this case, the ground terminal of the inverter can moreover be connected with the negative output of the direct voltage generator. This is made possible using a special storage choke composed of two magnetically coupled windings.

The advantage that this device allows for grounding the direct voltage generator with relatively simple means, in particular without transformer, is opposed by the disadvantage that it needs at least three active switches clocked at high frequency and that it is formed with two stages, which increases the expense in terms of controlling, results in unavoidable losses and impairs efficiency.

BRIEF SUMMARY OF THE INVENTION

In view of this prior art, the technical problem of the invention is to devise the inverter of the type mentioned above in such a manner that the potential of the direct voltage generator can be fixed with respect to ground potential not only with relatively simple means in terms of construction but also with a small number of components and with relatively small loads at least for the switches that must be switched at high frequency.

The characterizing features of claim 1 serve to solve this problem.

The invention proposes an inverter in a one-stage construction, i.e., an inverter in which the DC-DC part and the DC-AC part are combined into a combined circuit array with the possibility of boosting and bucking the input voltage. As a result, a common control is made possible in one single stage. Moreover, an inverter with only two high frequency switches is provided. Finally, the potential of the direct voltage generator can be fixed with respect to ground potential and power can be fed into the grid with a non intermittent current. By virtue of the relatively small number of components one further achieves high reliability and long useful life of the inverter.

Further advantageous features of the invention will become apparent from the dependent claims.

The invention will be best understood from the following description when read in conjunction with the accompanying drawings. In said drawings:

DETAILED DESCRIPTION OF THE INVENTION

Figure 1:
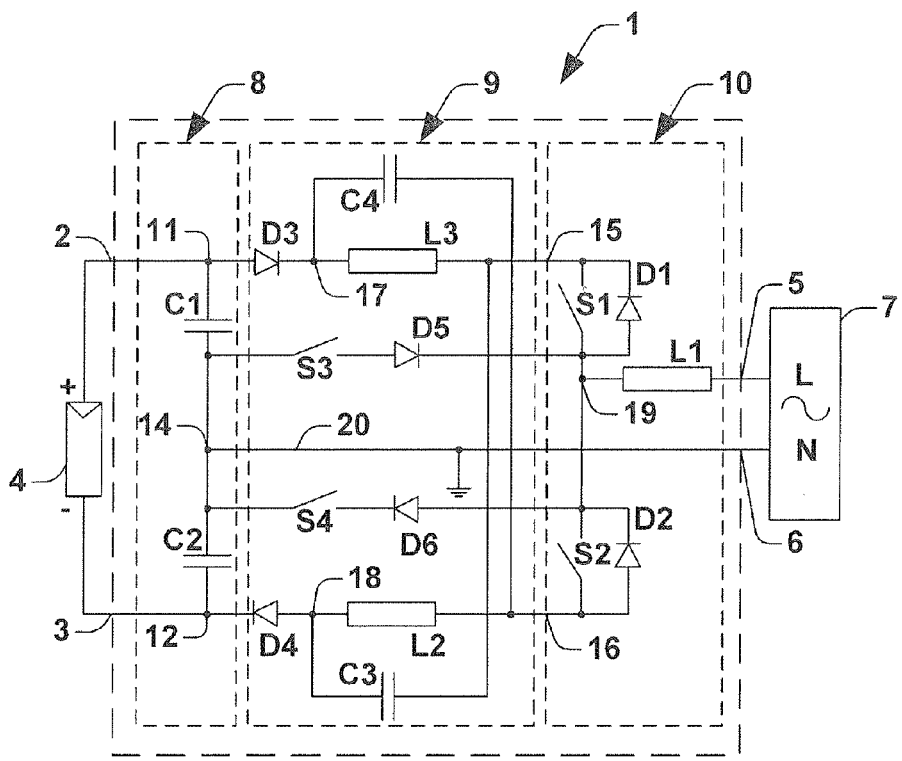
FIG. 1 is the circuit diagram of an inverter of the invention with switches essential to its function.

According to FIG. 1, a one-phase inverter 1 of the invention contains two inputs 2 (positive) and 3 (negative) intended to apply a direct voltage, said inputs being connected e.g., to the corresponding outputs of a direct voltage generator 4 in the form of a photovoltaic or fuel cell plant, a capacitor that has not been illustrated can be connected in parallel to said outputs as usual.

The inverter 1 further contains two outputs 5 and 6 that serve for delivering an alternating voltage and for connection e.g., to a schematically illustrated, one-phase utility grid 7 or to a load. A smoothing or grid choke L1 can be connected upstream of at least one of the outputs, this applying in the exemplary embodiment for the output 5 that is connected to phase L of the grid 7.

As contrasted with most of the known circuit arrays, no additional and separate DC-DC converter is interposed between the direct voltage generator 4 and the inverter 1. Instead, an inverter is proposed in accordance with the invention, which not only performs a DC-AC conversion as shown in FIG. 1, but is also suited for boosting or bucking the input voltage to a desired level, i.e., which also has the properties of the DC-DC converter with boosting-bucking function. Both functions are brought together in the inverter 1 of the invention. For this purpose, the inverter 1 comprises a first intermediate circuit 8, a second intermediate circuit 9 and a bridge section 10.

The first intermediate circuit 8 is connected to the two inputs 2 and 3 and contains two series-connected capacitors C1 and C2 that are connected with their one terminals 11, 12 to a respective one of the inputs 2 and 3 and with their other terminal to each other. This connecting point is at the same time a ground terminal 14 that has to be brought to ground potential. The intermediate circuit 8 thus is an actually known, bipolar intermediate voltage circuit that is devised for the bridge section 10 to be fed from a positive source C1 (top connection 11, positive to ground) and from a negative source C2 (lower connection 12, negative to ground). By grounding to ground terminal 14 and by using relatively high capacitances C1 and C2, one moreover achieves that the potential of the direct voltage generator 4 is relatively constant and that, even if there are parasitic capacitances to ground, no substantial stray currents are obtained.

The second intermediate circuit 9 contains a first series member consisting of a first diode D3 connected to terminal 11 and of a first storage choke L3 connected in series therewith, as well as a second series member consisting of a second diode D4 connected to terminal 12 and of a second storage choke L2 connected in series therewith. The other terminal of the storage choke L3 is connected to a first input 15, the other terminal of the storage choke L2 to a second input 16 of the bridge section 10. Moreover, the second intermediate circuit 9 contains a capacitor C4 that is connected on the one side with a connection point 17 between the diode D3 and the storage choke L3 of the first series member and on the other side with the input 16, as well as a capacitor C3 that is connected on the one side with a connecting point 18 between the diode D4 and the storage choke L2 of the second series member and on the other side with the input 15 of the bridge section 10.

The bridge section 10 is substantially formed by two series-connected switches S1 and S2, each comprising one first terminal connected with the input 15 or 16 and one second terminal. The two second terminals are connected together at a common connecting point 19 that is located between the two switches S1, S2 and that is connected to the one output 5 of the inverter 1 through the grid choke L1 thus leading, through the grid choke L1, to phase L of the grid 7. The normal conductor N of the grid 7 is connected to the output 6 of the inverter 1 and from there through a line 20 to the connecting point 14 between the two capacitors C1 and C2 and is brought to ground potential like this connecting point 14.

In the exemplary embodiment, the second intermediate circuit 9 further comprises two freewheeling paths that are each formed by one additional switch S3 and S4 respectively and by one diode D5 and D6 respectively that are connected in series therewith. The freewheeling path consisting of S3 and D5 lies between the connecting points 14 and 19, the diode D5 being conductive in the direction of the connecting point 19. The second freewheeling path S4 and D6 also lies between the two connecting points 14 and 19, but here, the diode D6 can only be made conductive in the opposite direction, meaning in the direction of connecting point 14.

Finally, one diode D1 and D2 can be connected in parallel with a respective one of the switches S1, S2 in the bridge section, the diode D1 being conductive in the direction of the input 15 and the diode D2, in the opposite direction toward the connecting point 19 between the two switches S1, S2.

The switches S1, S2 are switched at high frequency, e.g., at a frequency of 16 kHz or more, e.g., of 100 kHz, i.e., they are brought alternately into a conductive and into a non-conductive state, whereas the two switches S3 and S4 are only switched on and off at the mains frequency of e.g., 50 Hz or 60 Hz. In the exemplary embodiment, during the positive half wave of the current to be fed into the grid 7, switch S3 is in the conductive state and switch S4 in the non-conductive state, whilst during the negative half wave of the current to be fed into the grid 7, the situation is reversed so that switch S4 is conductive and switch S3, by contrast, non-conductive.

Generally, the basic idea of the invention is to provide two intermediate circuits 8 and 9 that are joined together. The first intermediate circuit 8 is connected to the DC generator 4 on the input side and substantially only consists of a storage configured to be a capacitive voltage splitter the connecting point 14 of which is connected to ground potential. As a result, the potential of the DC generator 4 is fixed with respect to ground potential, preferably symmetrically, with C1 being chosen to equal C2. By contrast, as will be discussed in closer detail herein after, the second intermediate circuit 9 serves on the one side to supply the bridge section 10 with the necessary electrical voltages which are positive or negative with respect to ground potential and on the other side e.g., to boost the output voltage of the first intermediate circuit 8 to the value desired for grid or load feeding by setting its output voltage by selecting the ratio at which the two switches S1, S2 are switched on simultaneously. In the exemplary embodiment, the second intermediate circuit 9 moreover has the function of providing a freewheeling path for the current flowing through the grid choke L1. All this is achieved by an integrated circuit array that only needs a small number of switches, provides for a small voltage load on the switches and allows for non-intermittent, continuous current feed into the grid 7. Moreover, the components D3, L3, C4, D5 on the one side and D4, L2, C3 and D6 on the other side are configured to be preferably completely symmetrical so that identical conditions are achieved for the current flows during the positive and negative half waves. Generally, an inverter 1 is thus obtained which comprises only two switches S1, S2 that are connected at high frequency and are subjected to relative low load.

The functioning of the inverter 1 described will be discussed in closer detail herein after with respect to the FIGS. 2 through 5 for the case in which one has a positive half wave, i.e., a positive output voltage is applied at the connecting point 17 and in which positive current is fed into the grid 7 through the grid choke L1.

We first assume that all the switches S1 through S4 are open. Then, after a short equalization, the operating condition becomes stationary as soon as the two capacitors, if C1=C2, are charged to the half generator voltage and the capacitors C3 and C4 are charged to full generator voltage via the current paths D3, C4, L2, D4 and D3, L3, C3 and D4 respectively. Now, no current flows through the storage chokes L2 and L3 and in FIG. 4, the capacitor C4 has its positive side on the left and the capacitor C3 on the right.

Figure 2:
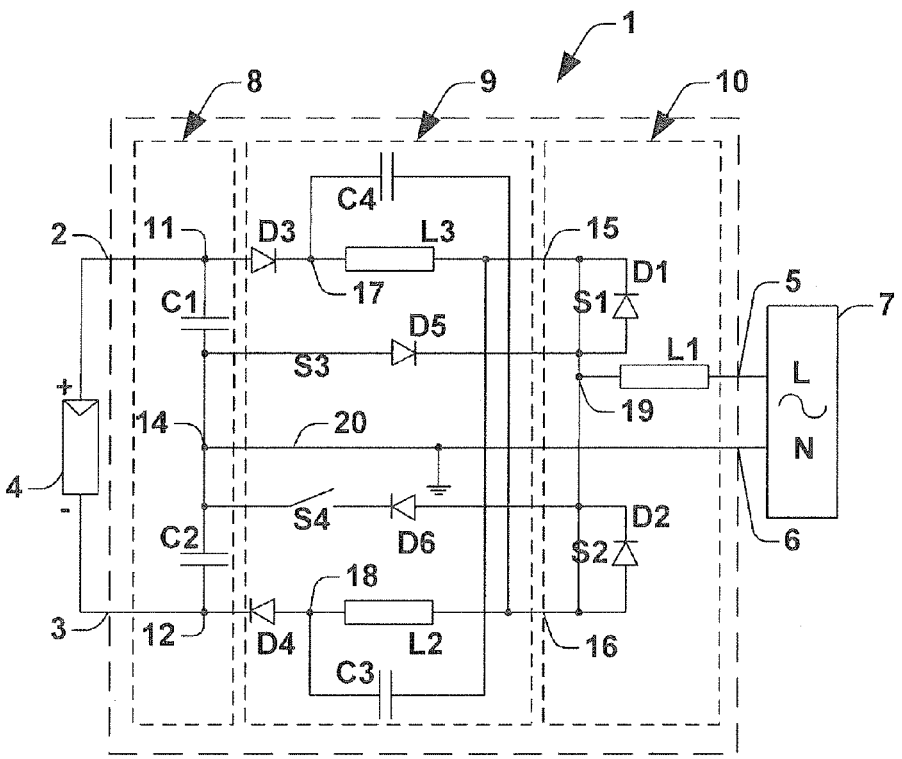
FIG. 2 through 4 show the operation of the inverter shown in FIG. 1 for positive output voltage and positive output current with three different switching states of the switches.
Figure 3:
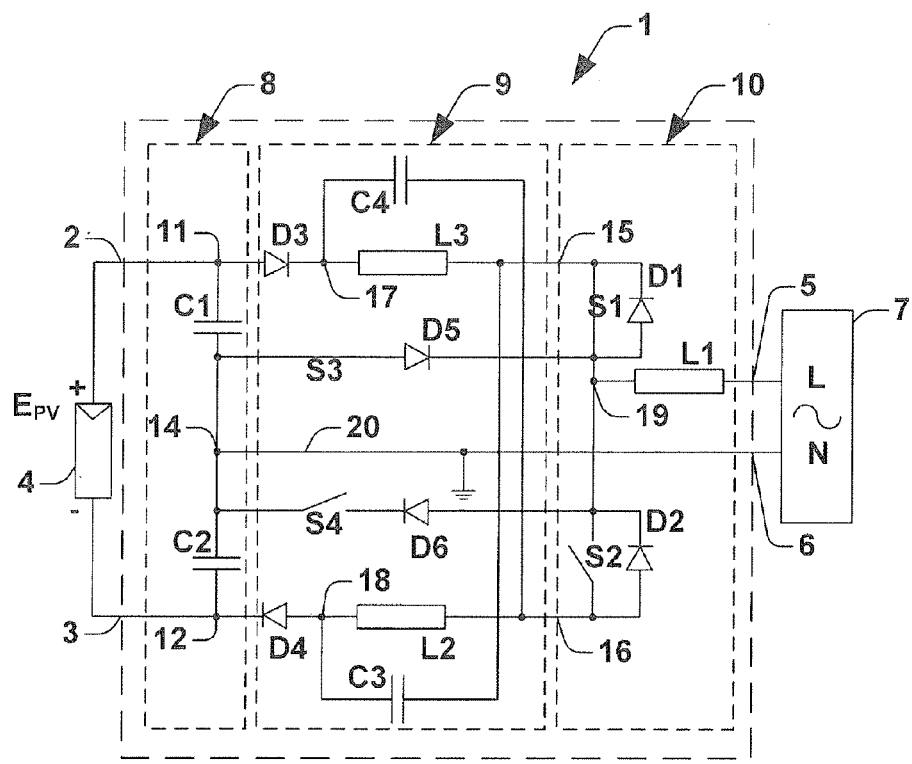
Figure 4:
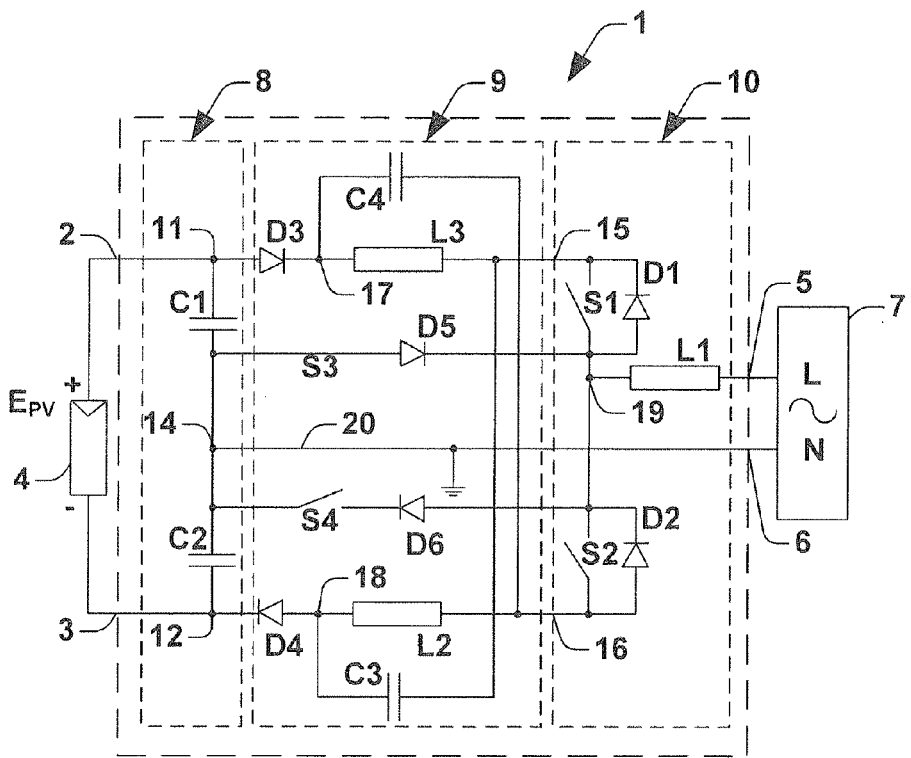
Figure 5:
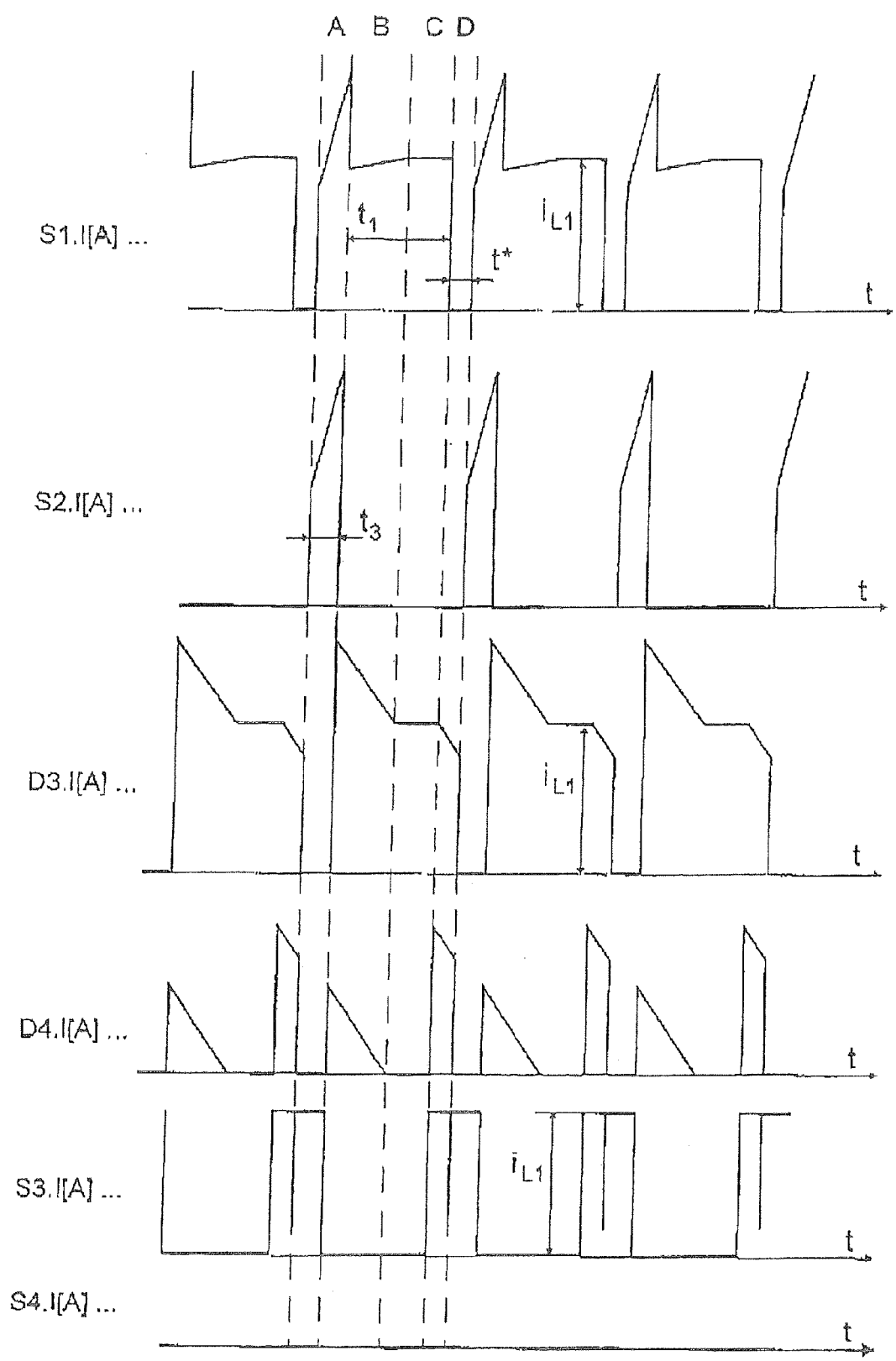
FIG. 5 shows the curve of currents occurring at different places during operation of the inverter of FIG. 1.

In order to allow for the boosting function, the two switches S1 and S2 are switched on simultaneously (overlapping), as is shown in FIGS. 2 and 5 for a time interval t3 and a phase A. Closing the switches S1, S2 results in the components C4 and L3 on the one side and C3, L2 on the other side to be connected in parallel or short-circuited. As a result, the capacitor C4 is discharged via a current path from C4 via L3, S1 S2 and back to C4 through the storage choke L3 and L3 is charged accordingly at the same time. Moreover, the capacitor C3 is discharged via a current path from C3 via S1, S2, L2 and back to C3 so that the storage choke L2 is charged. As a result, the currents S1 and S2 increase progressively in accordance with FIG. 5. Finally, a current flowing through the grid choke L1 toward the grid 7 and having been generated in L1 in a previous phase can continue to flow via a freewheeling path L1, 7, 20, 14, S3, D5, 19 and back to L1 since the switch S3 is permanently closed during the positive half wave. This can also be seen from FIG. 5 since S3 carries a current during t3 and allows for an freewheeling current that must not flow via the uncoupling and coupling diodes D3, D4. The freewheeling S3, D5 described would not be necessary if L1 were missing, which could be envisaged in principle. However, the grid choke L1 offers the advantage that it participates in smoothing the current to be delivered into the grid 7 and that it prevents this current from growing excessively. As further shown in FIG. 5, phase A leads to a progressive increase of the currents flowing through the switches S1, S2. The power flow in the second intermediate circuit 9 is prevented from being reversed by the locking action of the diodes D3 and D4.

In a following phase B, the switch S1 continues to be conductive during a first part of the time interval t1 (FIGS. 3 and 5), whilst the switch S2 is being brought into the opened condition. As a result, the short-circuit of L3, C4 and L2, C3 respectively is abolished so that power can now be transferred into the grid 7, starting from C1 via D3, L3, S1, 19, L1 to 7 and from there back via 20, 14 to C1. At the same time, the storage chokes L2, L3 can deliver their stored energy to the capacitors C3, C4, which are also charged by the capacitors C1, C2, thus generating at the connecting point 19 a higher voltage than the one at C1. With only two high frequency switches S1, S2, an inverter can thus be constructed that can feed without transformer into the grid from a voltage source the output voltage of which is smaller or higher than the peak value of the grid voltage.

According to FIG. 5, the current flowing through the grid choke L1 also flows through switch S1 whilst a decreasing current flows through D3 and D4, this being due to the progressive charge reversal L3 to C3 and L2 to C4. FIG. 5 moreover shows that the current through D4 is relatively small since, as contrasted with D3, the grid or load current carried by L1 does not flow through D4.

In the second part of the time interval t1 (phase C in FIG. 5) switch S1 is closed and switch S2 is open during phase B so that power is supplied to the grid 7 from the first intermediate circuit 8 via D3 and S1, L1. Like through S1, only the grid current still flows through the diode D3, said grid current being relatively constant and flowing from C1 via D3, L3, S1, 19, L1, 7, 20 and back to C1.

In a next step, which takes place during a time interval t* (see FIG. 4 and phase D in FIG. 5), the switch S1 is open, whereas the switch S2 remains open. As a result, the feeding cycle via S1, L1 is interrupted. The power stored in the grid choke L1 can however be dissipated via the first freewheeling path S3, D5, which is active now like in phase A and which allows for a current flow from L1 via 7, 20, S3, D5 and 19 back to L1. In FIG. 5, this manifests itself on the one side by a current through S3 that is almost unchanged over the end of phase C. On the other side, progressively decreasing currents, which, in phase D, are due to the fact that the capacitor C3 is further charged by the storage choke L3, which was conductive in the previous phase and which progressively discharges as a result thereof, now flow through the diodes D3 and D4.

Phase D is followed by other cycles with the phases A through D as shown in FIG. 5.

When a negative current is fed into the grid during the negative half waves, the inverter 1 described functions substantially in the same way, although circumstances complementing FIGS. 2 through 5 are obtained. This more specifically means that switch S4 is closed and switch S3 open during the negative half waves in order to provide an freewheeling path for a current flowing through the grid choke L1 in the opposite direction. On the other side, switch S2 is now kept closed in the phases B and C and switch S1 is opened instead. As a result, an electric circuit is active during phase B that leads from C2 via D4, L2, S2, L1 and 7 back to C2. In the phases A and B by contrast, an freewheeling path is active which leads from L1 via S2, L2, D4, C2, 20 and 7 back to L1.

During the negative half waves also, the capacitors C3, C4 are boosted to a preselected value by the high switching frequencies and by a preselected duty cycle determining the boosting degree. Theoretically, the voltage C3 and C4 would continue to increase both during the positive and during the negative half wave. Since power is permanently drawn from the capacitors C3, C4 by feeding power into the grid 7 or through a resistive load, the voltages at C3, C4 are prevented from increasing above a preselected value.

Irrespective thereof, the storage choke L3 is more strongly charged during the positive half waves and storage choke C2, during the negative half waves.

Generally, one thus obtains an inverter 1 capable of delivering an output voltage that is variable within wide limits without a usual DC-DC converter and with only two high frequency switches S1, S2. The boosting function is thereby achieved by reversing the charge of the magnetic stores L2, L3 and the capacitive stores C3, C4 and substantially by the fact that the power stored in the storage chokes L2, L3 when the switches S1 and S2 are closed is delivered to the capacitors C1, C4 by opening at least one of the two switches S1, S2 in order to charge said capacitors to an intermediate circuit voltage that is higher than the input voltage.

Figure 6:
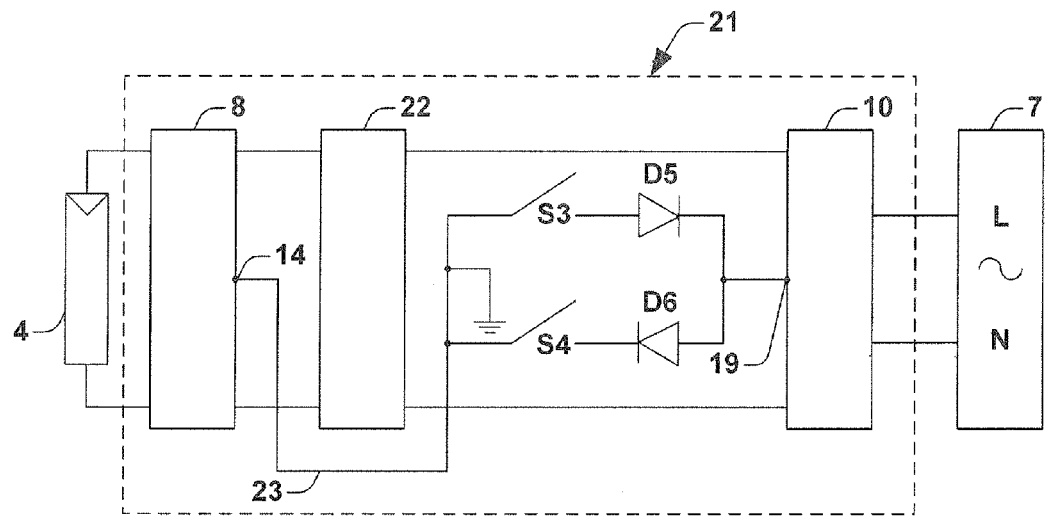
FIG. 6 schematically shows an exemplary embodiment of the inverter of the invention, modified over FIG. 1.

An exemplary embodiment of an inverter 21 is shown in FIG. 6 that contains, in analogous fashion as in FIG. 1, the first intermediate circuit 8 connected to the direct voltage generator 4 and the bridge section 10 intended for connection to the grid 7. Further, a second intermediate circuit 22 is connected between the first intermediate circuit 8 and the bridge section 10. As contrasted with FIG. 1, the two freewheeling paths S3, D5 and S4, D6 are not integrated in the second intermediate circuit 22 but are disposed separately and outside of the second intermediate circuit 22. For this purpose, a line 23 leads from the connecting point 14 between the two capacitors C1, C2 (FIG. 1) to the input of a parallel circuit composed of S3, D5 and S4, D6. This parallel connection is e.g., interposed between the second intermediate circuit 22 and the bridge section 10 and is connected at its output to the connecting point 19 between the two switches S1, S2 (FIG. 1) of the bridge section 10. There is no difference in the function as described herein above.

The control signals for the switches S1, S2 are generated appropriately during the time span t3, t1 and t* shown in FIG. 5 using the usual means used for PWM controls, the objective being to approximate as close as possible the output current of the inverter 1 to a sinus shape. For this purpose, a reference signal in the form of a triangular or a sawtooth signal can be compared for example with a target value signal, the reference signal being generated separately for each polarity of the output voltage.

Figure 7:
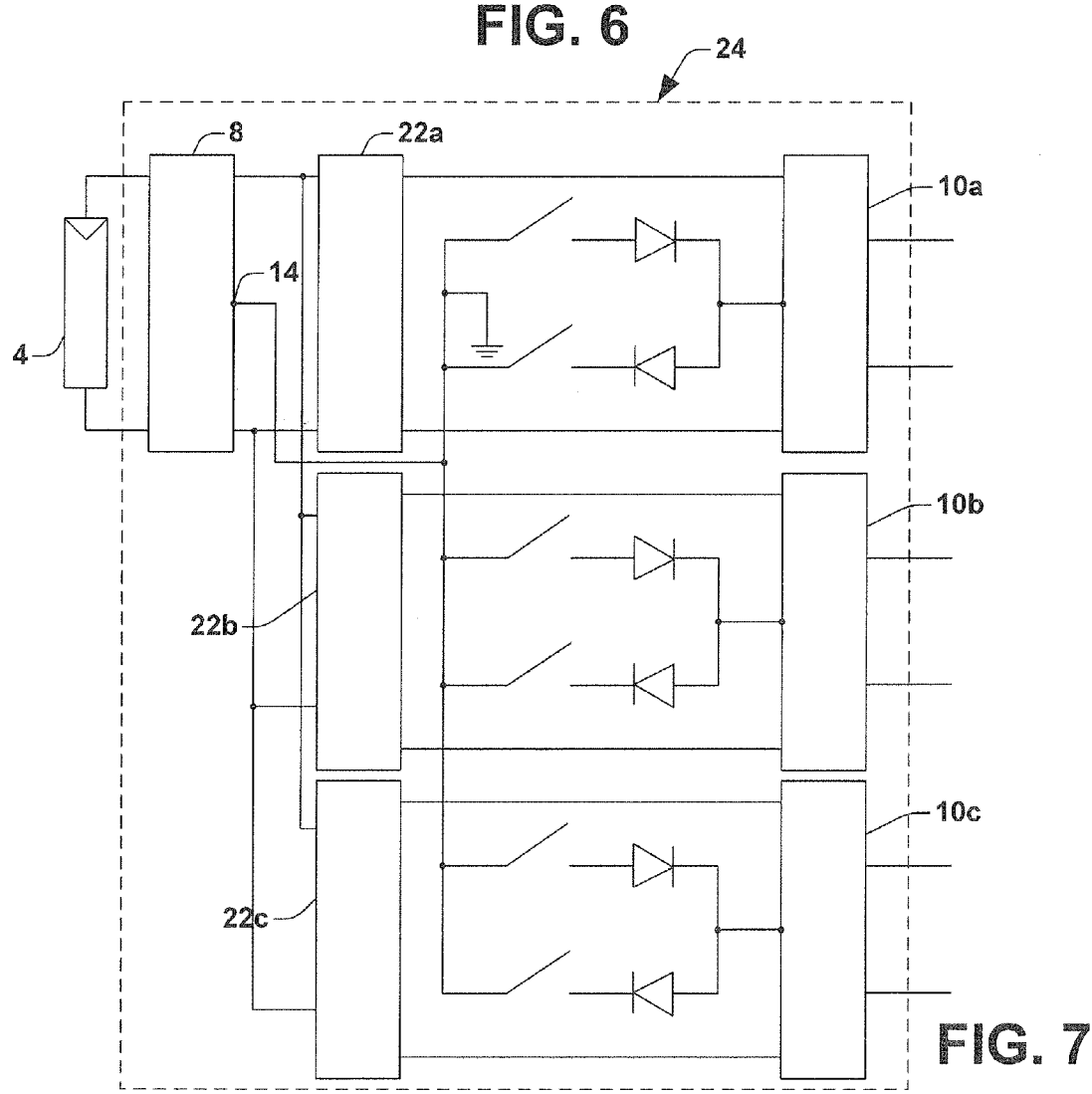
FIG. 7 shows an inverter of a construction analogous to that of FIG. 6 but with three phases.

FIG. 7 schematically shows the structure of a three-phase inverter 24. This structure is obtained by the fact that for each phase of the grid 7 a separate second intermediate circuit 22a, 22b and 22c is provided, which could be provided with one external freewheeling group each. Alternatively however, three second intermediate circuits 9 configured in accordance with FIG. 1 could also be used. Moreover, a bridge section 10a, 10b and 10c configured in accordance with the FIGS. 1 and 6 is connected to each second intermediate circuit 22a, 22b and 22c, said bridge section supplying one of the three phases of the grid with current.

The invention is not limited to the exemplary embodiments described, which can be varied in many ways. It is clear in particular that in the description given herein above only those components were described that were necessary to garner an understanding of the invention, and that in particular the necessary and actually known controls, MPP controls and so on can be provided additionally. Moreover, it is understood that the various components can also be used in other combinations than those described and illustrated.

We claim:

1. An inverter for feeding power from a DC source connected at input terminals to an AC grid connected at a first and a second output terminal, the inverter comprising:
   a first intermediate circuit comprising two series-connected capacitors connected between the input terminals, with a midpoint between the series-connected capacitors being connected to the first output terminal;
   a second intermediate circuit coupled to the input terminals through respective diodes, the second intermediate circuit comprising two storage chokes and two storage capacitors;
   a bridge circuit comprising two series-connected bridge switches; and
   a grid choke connecting a midpoint of the bridge switches to the second output terminal, and a switchable freewheeling path connected to the midpoint of the bridge switches,
   wherein the two storage chokes connect the input terminals to the bridge circuit, and wherein the storage capacitors cross-couple the two storage chokes to each other,
   wherein, in the cross-coupling, a first terminal of a first storage choke of the two storage chokes is coupled to a second terminal of a second storage choke of the two storage chokes via a first capacitor of the two storage capacitors, and a first terminal of the second storage choke is coupled to a second terminal of the first storage choke via a second capacitor of the two storage capacitors.

2. The inverter of claim 1, wherein the storage capacitors are substantially of equal capacitance, and the storage chokes are substantially of equal inductance.

3. The inverter of claim 1, wherein the switchable freewheeling path comprises anti-parallel branches of a switch and a series-connected diode each.

4. The inverter of claim 1, wherein either side of the bridge circuit is connected to a corresponding one of the input terminals via a series-connection of one of the diodes and one of the storage chokes.

5. The inverter of claim 1, wherein the inverter is configured to feed into a three-phase grid, and wherein the second intermediate circuit and bridge circuit comprise three second intermediate circuits and three bridge circuits respectively coupled together to form three parallel configured arrangements each connected to the first intermediate circuit, and wherein each of the parallel configured arrangements is configured to feed into a respective phase of the three-phase grid.

6. An inverter for feeding power from a DC source connected at input terminals to an AC grid connected at a first and a second output terminal, the inverter comprising:
   a first intermediate circuit comprising two series-connected capacitors connected between the input terminals, with a midpoint between the series-connected capacitors being connected to the first output terminal;
   a second intermediate circuit coupled to the input terminals through respective diodes;
   a bridge circuit comprising two series-connected bridge switches; and a grid choke connecting a midpoint of the bridge switches to the second output terminal, and a switchable freewheeling path connected to the midpoint of the bridge switches, wherein the second intermediate circuit is configured to at least partially discharge first and second storage capacitors of the second intermediate circuit to form a discharge current in first and second storage chokes of the second intermediate circuit in a first phase, when the two bridge switches are closed, in order to boost a voltage of the DC source for delivery of the boosted voltage to the second output terminal in a subsequent second phase, when one of the bridge switches is closed and the other of the bridge switches is open.

7. The inverter of claim 6, wherein the second intermediate circuit comprises:
the first and second storage chokes coupled to the respective diodes; and
the first and second storage capacitors cross-coupled between an input of one of the first and second storage chokes and an output of the other of the first and second storage chokes, respectively.

8. The inverter of claim 6, wherein the second intermediate circuit comprises a first and a second parallel storage branch, each storage branch comprising a series-connection of a storage choke and a storage capacitor, wherein the bridge is connected between midpoints of the parallel storage branches.

9. The inverter of claim 6, wherein the inverter is operable in a first mode comprising boosting the voltage, in case the voltage of the DC source is smaller than a maximum voltage of the AC grid, and wherein the inverter is operable in a second mode, in which one or none of the bridge switches is closed at any time, when the voltage of the DC source exceeds a maximum voltage of the AC grid.

10. The inverter of claim 6, wherein the inverter is configured to feed into a three-phase grid, and wherein the second intermediate circuit and bridge circuit comprise three second intermediate circuits and three bridge circuits respectively coupled together to form three parallel configured arrangements each connected to the first intermediate circuit, and wherein each of the parallel configured arrangements is configured to feed into a respective phase of the three-phase grid.

11. An inverter, comprising:
a first intermediate circuit configured to receive a DC voltage at an input, and provide a stabilized DC voltage at an output thereof;
a second intermediate circuit configured to receive the stabilized DC voltage at an input and generate a boosted stabilized DC voltage at an output thereof;
a bridge circuit configured to receive the boosted stabilized DC voltage and convert the boosted stabilized DC voltage to an AC voltage that drives a first choke at an output thereof; and
a freewheeling path circuit configured to provide a current path for current associated with the first choke when the bridge circuit discontinues driving the first choke,
wherein the bridge circuit comprises two series-connected switches connected together at an output node connected to the first choke, and wherein a magnitude of the boosted stabilized DC voltage is a function of a time period in which both of two series-connected switches are closed.

12. The inverter of claim 11, wherein the freewheeling path circuit is configured to provide the current path for current associated with the first choke when both of the two series-connected switches are open.

13. The inverter of claim 11, wherein the freewheeling path circuit comprises:
a positive AC half wave portion configured to provide a first directional current path for current associated with the first choke when both of the two series-connected switches are open during a positive AC half wave of the AC voltage; and
a negative AC half wave portion configured to provide a second, opposite direction current path for current associated with the first choke when both of the two series-connected switches are open during a negative AC half wave of the AC voltage.

14. The inverter of claim 11, wherein the inverter is configured to feed into a three-phase grid, and wherein the second intermediate circuit and bridge circuit comprise three second intermediate circuits and three bridge circuits respectively coupled together to form three parallel configured arrangements each connected to the first intermediate circuit, and wherein each of the parallel configured arrangements is configured to feed into a respective phase of the three-phase grid.

* * * * *